Figure 1:
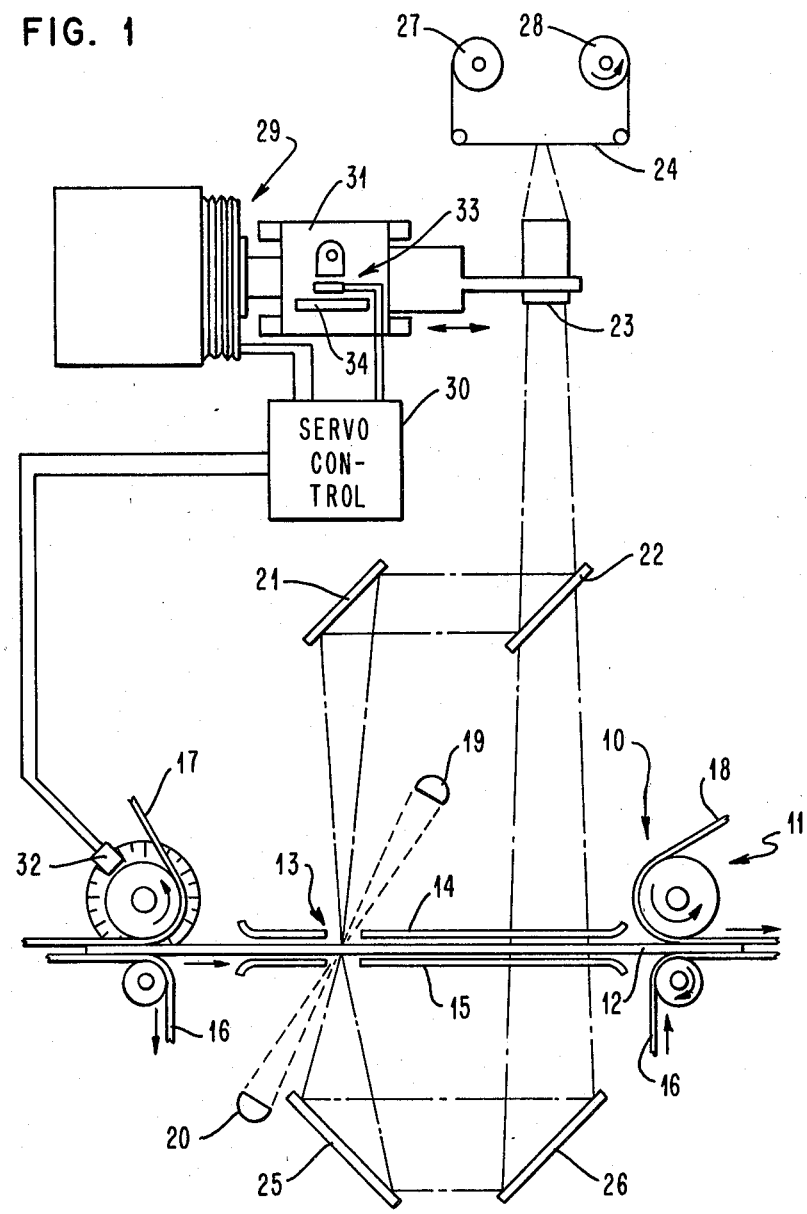

United States Patent [19]

Howard

[11] 4,374,618
[45] Feb. 22, 1983

[54] MICROFILM CAMERA HAVING A MOVING LENS

[75] Inventor: Thomas W. Howard, Harrisburg, N.C.

[73] Assignee: IBM Corporation, Armonk, N.Y.

[21] Appl. No.: 244,458

[22] Filed: Mar. 16, 1981

[51] Int. Cl.³ .................... G03B 27/48; G03B 27/50
[52] U.S. Cl. ........................................ 355/50; 355/23; 355/65; 355/66; 355/51
[58] Field of Search .................. 355/23, 24, 25, 26, 355/8, 11, 64, 65, 66, 50, 51, 77; 354/82, 293

[56] References Cited

U.S. PATENT DOCUMENTS

| | | | |
|---|---|---|---|
| 2,756,015 | 7/1956 | Larisch | 354/293 |
| 3,023,993 | 3/1962 | Kerley, Jr. | 248/358 |
| 3,057,592 | 10/1962 | Thrasher | 248/358 |
| 3,073,584 | 1/1963 | Troeger | 267/1 |
| 3,181,918 | 5/1965 | Troeger | 308/2 |
| 3,549,244 | 12/1970 | Shaffer | 350/287 |
| 3,635,466 | 1/1972 | Townsend | 271/52 |
| 3,811,665 | 5/1974 | Seelig | 167/160 |
| 4,087,173 | 5/1978 | Beery | 355/24 |
| 4,091,428 | 5/1978 | Saito et al. | 360/104 |
| 4,123,147 | 10/1978 | Hill et al. | 350/285 |

Primary Examiner—Monroe H. Hayes
Attorney, Agent, or Firm—E. Ronald Coffman

[57] ABSTRACT

A microfilm camera employs a reciprocating lens to optically arrest motion of documents traveling in a high-speed stream for photographic exposure onto stationary, incrementally advanced photographic film. The reciprocation of the lens is controlled by a closed loop servo system. To enhance performance of the servo system, the lens is supported by a four-bar linkage comprising relatively stiff light-weight arms interconnected by crossed leaf spring hinges.

7 Claims, 2 Drawing Figures

MICROFILM CAMERA HAVING A MOVING LENS

FIELD OF THE INVENTION

This invention relates to a microfilm camera for photographically exposing images of a high-speed stream of documents, such as bank checks, onto microfilm. A moving lens is employed to project a stationary image onto the film from the moving documents.

BACKGROUND OF THE INVENTION

Microfilm cameras having a servo drive lens supported by a flexible four-bar linkage, have been known.

It is desirable that such a system be capable of producing high resolution images from documents moving at a high rate of speed. Furthermore, the servo mechanism should be capable of responding to the demands of documents of different length and to inter-document gaps of different length. Furthermore, microfilm cameras of this type are generally made as part of a larger machine including separate mechanisms which can provide potential sources of resonance stimulation. For maximum precision, the servo control should employ a feedback transducer that is connected as integrally as possible with the lens, itself. Extraneous motion of the lens thus can be a source of servo instability.

SUMMARY OF THE INVENTION

My invention provides a shuttle lens support, having the advantages of providing a relatively low-energy, low-inertia moving support for the lens in the direction of its reciprocal movement while simultaneously providing an integrated body stiffness that, in all other dimensions, eliminates low-frequency resonances of the type that interfere with stable servo control. More particularly, the shuttle of my invention is formed as a four-bar linkage, the moving arms of which are interconnected by crossed leaf springs that provide a low-spring rate pivotal freedom while resisting translational and torsional movements. The moving arms of the four-bar linkage are configured to optimize the countervailing requirements of high stiffness and low mass. The lens support shuttle of my invention thus provides a moving element having a relatively large interference-free servo mechanism bandwidth.

Figure 2:
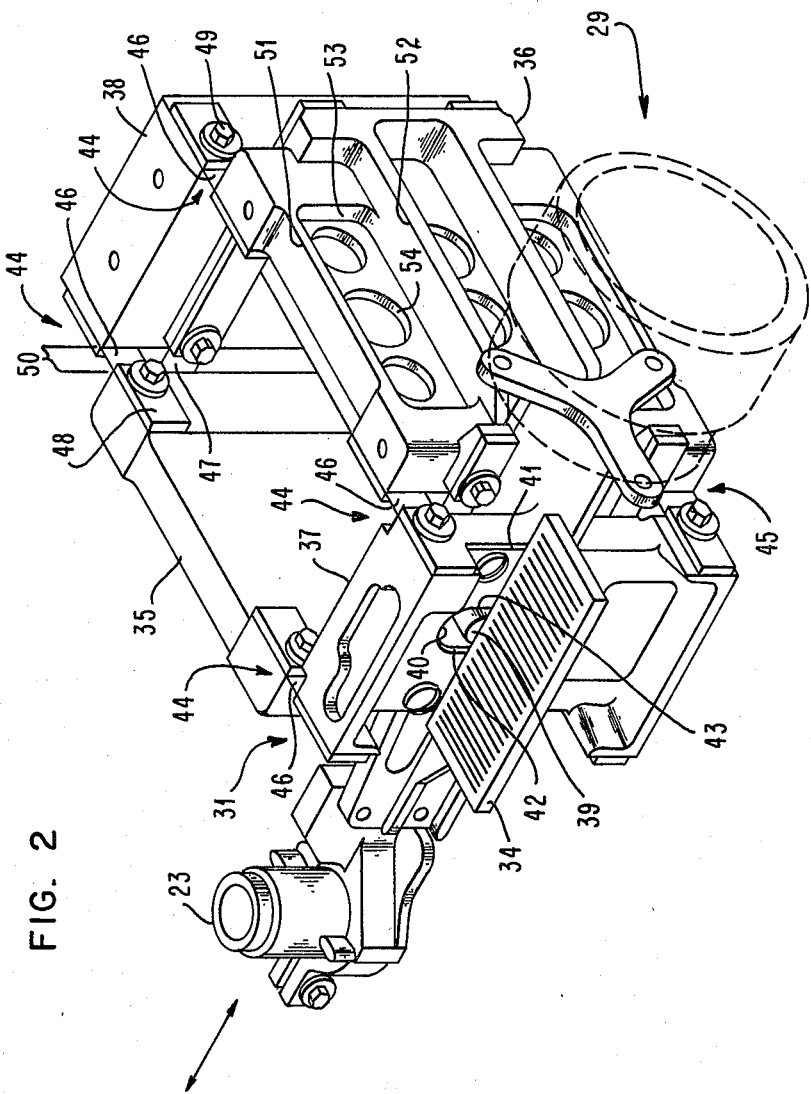

These and other features and advantages of my invention will be appreciated by those skilled in the art, from the following description of an illustrative preferred embodiment wherein reference is made to the accompanying drawings, of which FIG. 1 is a schematic elevational view of a microfilm camera having a lens support shuttle, constructed in accordance with my invention, and FIG. 2 is a perspective detailed view of the lens support shuttle shown in FIG. 1.

In FIG. 1 there is shown a mirofilm camera 10, including a drive belt mechanism 11 which feeds documents such as bank checks and deposit slips 12 past an exposure slit aperture 13 in a pair of guide plates 14 and 15. The drive mechanism 11 consists of a lower belt 16 that is power driven by motor means not shown, a feed belt 17 and a delivery belt 18. The belts and their associated drive means are only partially shon, as they form no part of my invention. The drive mechanism is one example of a source of vibrational stimulus that potentially can interfere with stable servo operation.

A pair of lamps 19 and 20 illuminate the aperture 13 to enable the projection of a slit image of a transverse portion of the check 12 as it passes the aperture 13. Mirrors 21 and 22 reflect the slit image from the top surface of check 12 to an optical element such as a lens 23 and onto the photosensitive surface of photographic film 24. Similarly, mirrors 25 and 26 project a slit image of the underside of check 12 to lens 23 for projection onto an adjacent portion of film 24. For ease of understanding, film 24 has been shown, together with a supply spool 27 and takeup spool 28 oriented to align film 24 with the path of document 12; however, it is preferred to have the film 24 rotated 90° from the position shown such that the images of the checks 12 are oriented with their long dimensions transverse to the film 24 as is shown, for example, in U.S. Pat. No. 3,885,871.

Mirrors 25 and 26 form an offset optical path that avoids interference with the path of checks 12 and the mirrors 21 and 22.

Lens 23 is moved in the direction of the motion of checks 12 at a rate of speed that is proportional to the lens magnification ratio whereby the slit reflection projected from aperture 13 traverses stationary film 24 in synchronism with the movement of checks 12. The check image itself remains stationary with respect to film 24 to provide a high-resolution photographic exposure. The required scanning motion is produced by a closed loop servo mechanism including a voice coil motor 29 controlled by a servo control circuit 30 and connected to a lens support shuttle 31. The servo control 30 responds to an emitter 32 indicating the speed of the check feed belt 17 and also to a position feedback transducer 33, including a grid element 34 that is connected to the lens support shuttle 31. The servo control 30 moves the lens 31 upon demand as checks pass aperture 13 in accordance with a stored program that precisely tracks the motion of checks. While my invention is particularly beneficial for use in conjunction with a servo mechanism having closed loop feedback such as that shown herein, the details of appropriate servo controls are otherwise known to those skilled in the art and form no part of my invention.

The details of a lens support shuttle 31 constructed in accordance with my invention are shown in FIG. 2. The shuttle 31 is formed as a four-bar linkage, including parallel side arms 35 and 36, shuttle arm 37, and stationary frame part 38. A bumper rod 39 is mounted on frame part 38 and extends outwardly into an opening 40 in shuttle arm 37. Cutout plate 41 defines step edges 42 and 43 which can engage bumper rod 39 to limit motion of shuttle arm 37 in case of motor control failure.

The arms 35, 36 and 37 and the frame part 38 are interconnected to form a parallelogram by hinge means comprising upper and lower crossed leaf spring pairs 44, 45 respectively, each of which includes a first or outwardly directed leaf spring 46 and a second or laterally directed leaf spring 47, arranged at substantially right angles to the first leaf spring. Clamping plates 48, held in place by screw fasteners 49, secure the leaf springs 46 and 47 at their end to the members of the shuttle 31. A small free span 50 of each leaf spring 46 and 47 permits pivotal motion of the arms that is resisted by a relatively low spring rate. Translational or tensional motion of the arms 35, 36 and 37 is resisted by the column strength of the leaf springs 46 and 47. The arms 35, 36 and 37 are preferably relatively deep to provide vertical and torsional stiffness. That is to say, their dimension, parallel to the print axes of the vertical hinge means 44, 45, is similar in magnitude to the length of the arms between hinge means. The lens 23 is supported in a plane that is positioned substantially midway between the upper and lower leaf spring pins 44 and 45. Torsional stiffness of the shuttle 31 maintains the lens 23 in focus on the film 24. The arms 35, 36 and 37 are configured through the use of ribs such as 51 and 52, and cut-out portions such as 53 and 54, to have a high stiffness-to-mass ratio. The relatively stiff configuration of the arms, together with the constrained movement provided by the crossed leaf springs 46 and 47, produces an integrated moving body that inherently resists low frequency resonances of the type that tend to interfere with stable servo motor control. This is particularly important where the position tracking feedback for operating the servo motor control is directly connected with the lens being tracked, and thus is subject to the maximum combination of motions in the system. The resistance to resonant behavior at low frequency is also particularly important in systems such as the microfilm camera 10 wherein a variety of mechanisms, for example the drive belt mechanisms, provide a number of vibrational frequency sources capable of stimulating resonant behavior.

From the foregoing description of my invention, it will be recognized that the shuttle configuration I have described provides for a minimum of spring rate and inertial load to be imposed upon the servo mechanism, and provides a directional stiffness by which interfering low frequency resonances are avoided.

I claim:

1. A camera for recording an image of moving documents onto a substantially stationary photosensitive surface wherein the image is projected onto the photosensitive surface by an optical element supported by a four-bar linkage for movement in proportional synchronism with the document to substantially arrest motion of the image with respect to the photosensitive surface, and wherein the improvement comprises:
   a frame part;
   said four-bar linkage having a pair of side arms and a shuttle arm connected therebetween, each of said arms being configured to have high stiffness and low mass;
   hinge means interconnecting said arms and frame part, said hinge means each comprising a pair of substantially transversely oriented leaf springs which are securely clamped at each end to respective ones of said frame part and said arms.

2. A camera as defined in claim 1 wherein said optical element is moved by motor means, controlled by servo controlled circuitry, responsive to a feedback transducer including an element mounted on said shuttle arm.

3. A camera as defined in claim 1 wherein said optical element is mounted on said shuttle arm.

4. A camera as defined in claim 1 wherein said optical element is a lens.

5. A camera as defined in claim 1 wherein the dimension of said side arms in a direction parallel to the axis of said hinge means is similar in magnitude to the length of the side arms between said frame part and said shuttle arm, each of said hinge means comprising a first and second spaced apart ones of said leaf spring pairs, and wherein said optical element is supported in a plane located substantially midway between the leaf spring pairs of said hinge means.

6. A camera as defined in claim 1 further comprising:
   a stationary bumper member extending from said frame part toward said shuttle arm, and stop means on said shuttle arm for engaging said bumper to define limits of reciprocal motion of said shuttle arm.

7. A camera as defined in claim 1 wherein said side arms are parallel.

* * * * *